United States Patent [19]

Wommelsdorf et al.

[11] 3,954,374
[45] May 4, 1976

[54] DEVICE FOR THE MANUFACTURE OF DEEP-DRAWN OBJECTS USING SYNTHETIC, THERMOPLASTIC FOILS

[75] Inventors: Fritz Wommelsdorf; Werner Schmidt, both of Hamburg, Germany

[73] Assignee: Maschinenfabrik Rissen G.m.b.H., Hamburg, Germany

[22] Filed: July 17, 1974

[21] Appl. No.: 489,109

Related U.S. Application Data

[62] Division of Ser. No. 253,122, May 15, 1972, abandoned.

[30] Foreign Application Priority Data

May 14, 1971 Germany............................ 2123916

[52] U.S. Cl............................ 425/388; 425/398; 425/387 R
[51] Int. Cl.²........................................ B24C 17/03
[58] Field of Search................ 425/324 R, 325, 326, 425/348, 398, 388, 384, 387 R, DIG. 200, DIG. 201; 264/89, 90, 92, 93, 94, 327

[56] References Cited
UNITED STATES PATENTS

| | | | |
|---|---|---|---|
| 2,935,828 | 5/1960 | Mahoffy et al. | 53/112 A |
| 3,159,695 | 12/1964 | Behringer | 264/92 X |
| 3,235,639 | 2/1966 | Knowles | 425/388 X |
| 3,348,266 | 10/1967 | Brown et al. | 425/384 X |
| 3,507,007 | 4/1970 | Martin | 425/388 |
| 3,661,484 | 5/1972 | Psota et al. | 425/388 X |
| 3,661,489 | 5/1972 | Moore | 425/388 X |
| 3,739,052 | 6/1973 | Ayres et al. | 264/92 |

*Primary Examiner*—J. Howard Flint, Jr.

[57] ABSTRACT

A process and apparatus for forming objects of thermoplastic material by deep-drawing in which portions of a foil are cut to a size appropriate for each object, and are then freely supported while heating to the desired temperature. After heating the cut-out portions are tensioned about the edges thereof for the deep-drawing step. Modifications include multiple stations for heating and deep-drawing and means may be provided for deep-drawing the foil into a permeable container so as to line it with the deep-drawn thermoplastic material.

8 Claims, 4 Drawing Figures

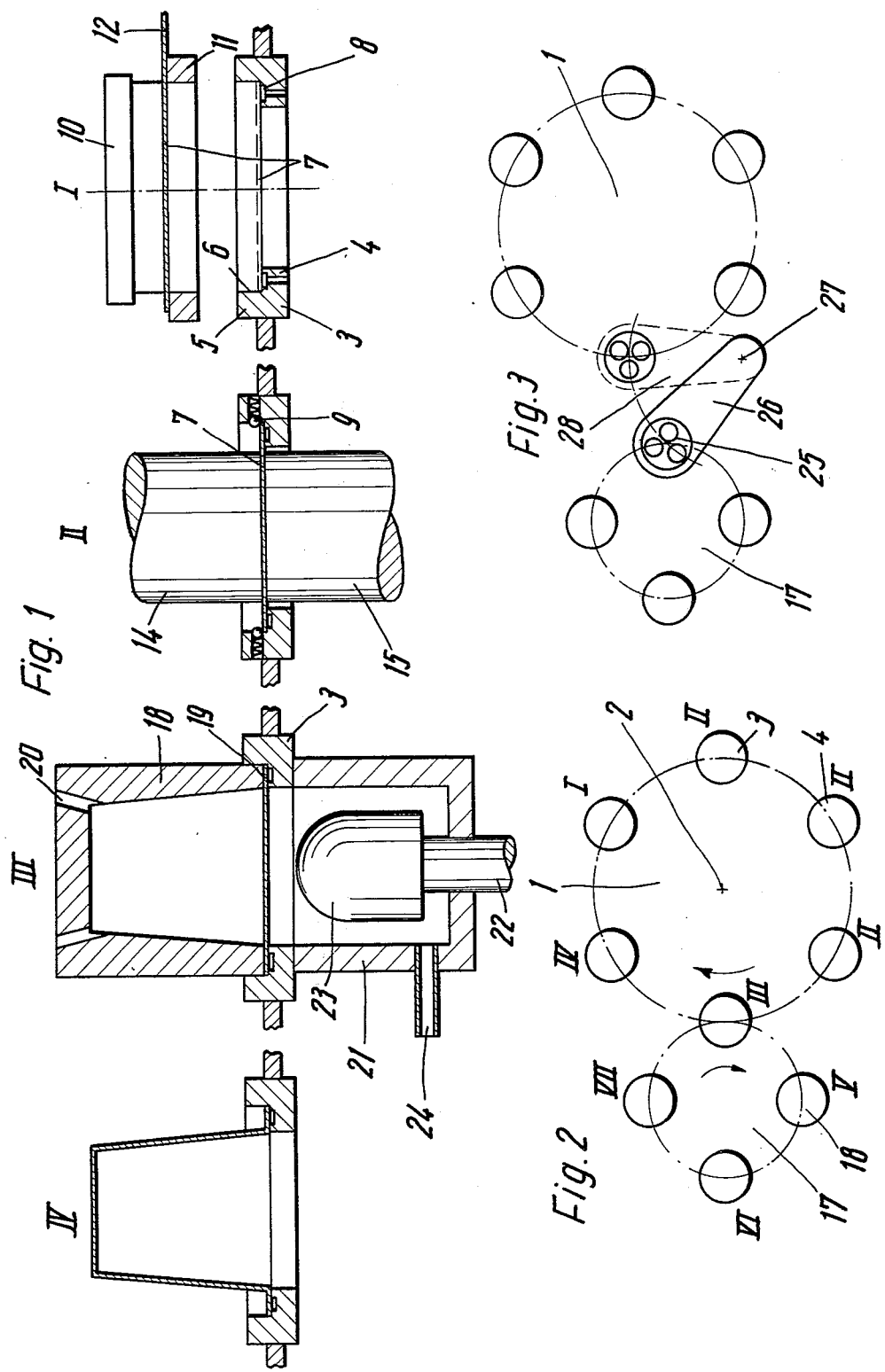

DEVICE FOR THE MANUFACTURE OF DEEP-DRAWN OBJECTS USING SYNTHETIC, THERMOPLASTIC FOILS

This is a division of application Ser. No. 253,122, filed May 15, 1972, now abandoned.

The invention concerns an apparatus for manufacturing deep-drawn objects by making use of thermoplastic synthetic foils made deformable through heating, during which process several component parts appropriately cut-out so as to correspond to the outlines of the object to be manufactured will be subjected in a heated state and tensioned at the edges to a deep-drawing operation.

Individual cutting prior to heating and deep-drawing conventionally takes place only when manufacturing very large objects or when making a limited number on simple machines. In that case the parts cut out first are tensioned in the tension-frame, then they will be heated in that state and thereafter they will be shaped. Thereafter the marginal edge required for tensioning is cut off if the finished goods are to be without such an edge, as for instance when dealing with washing tanks or the like. Individual cut out portions have been abandoned in the transition to the machines used in mass-production. Rather, a large number of similar objects can be deep-drawn from a large foil which is supported during the heating process by means of non-tensioning holding devices, which themselves are affixed to the form or mold. It is immediately evident that in such a manner, a large production of units per unit time is possible even when resorting to only a few individual shaping operations, and that the output is merely limited by the number of parts that shall be formed or shaped during each shaping step. This method however suffers from a drawback, namely that fairly large marginal edges are required during heating of large foil areas when the foils must be transported and also for the spacing between component parts as demanded by the apparatus. Simultaneous heating of large foil areas may well introduce difficulties because even minor interferences, such as drafts, may result in too low a temperature at portions of the foil and therefore deformation conditions at different locations of the same foil may not be uniform and variations in finished products will be encountered. Another source of irregularity is that the center areas of the foil become thinner during deep-drawing than those areas along the edges. Thus the wall-thickness of individual containers will not always be uniform and difficulties may later be encountered when sealing. Finally, known machines suffer from appreciable drawbacks also because the stamped shapes made from large, continuous foil areas cannot be stored or if stored only with great difficulties — at least this is the case for machines simultaneously shaping a great many objects.

The invention therefore addresses itself to the task of providing an apparatus of the kind mentioned initially, allowing the very regular manufacture of evenly formed structures having uniform walls, such apparatus further permitting better use of the material and finally enabling easy storing and piling up of the finished products. The invention further addresses itself to the task of providing a device for carrying out this procedure or process.

The invention aims at mass production of objects of small or medium dimensions, for instance drinking cups, food containers, yogurt cups and the like.

The first step of the method consists in departing from former methods for mass-production in which at each shaping stroke a large number of objects are manufactured simultaneously. Rather the starting point of the present process is the procedure in which the component parts for each object to be manufactured are previously cut out.

The invention's second step consists in pre-heating the component parts before they are tensioned rather than at the time of tensioning, as is the case for said known procedures dealing with deep-drawing.

At first sight, it may seem surprising that cutting out the individual parts, which to date has only proved itself for the manufacture and finishing of small quantities, or for special orders, should be proposed for mass production. Indeed, such starting point would render the solution of this invention's problems impossible, were it not for the second idea pertaining to the invention, namely, that the component parts be tensioned only after heating, so that it is no longer necessary to heat synchronously with the tensioning step, and therefore the stroke-period may be shortened. Only such sequence will allow a procedure with a rapid series of strokes in the case of the individual cut components.

The tensioning of the component parts only after heating them does in no way, as is quite obvious, eliminate the function of the holding devices during heating. A special characteristic of the invention provides that a part of the tensioning frame supports the component part during heating yet only exerts tension after heating and prior to deep-drawing by means of the additional parts of the tensioning frame.

Another important characteristic of the invention may consist in preventing a border strip of the component part from being heated to deep-draw temperatures. Many foil substances are characterized by their tendency to deform under when not tensioned heating. This tendency may be counteracted by keeping the border strip cold and therefore strong so that it may exert a certain holding effect upon the central, softer part of the component part. This characteristic of the invention will be particularly significant when cups with flat marginal edges are manufactured, where the edges are of relatively large and uniform thickness, as occurs when a cover foil is to be welded onto such an edge. In such cases the cut-out components will be appropriately tensioned along this edge. Since the latter does not reach the deformation temperature, it will also remain constant in strength, stiffness and uniformity as is the case for the initial cut-out portion. The invention's teaching, namely that the border strip should remain cold or below the deep-draw temperature, of course does not mean that the strip should be at room temperature. The fundamental idea rather is that the border strip shall be kept at a temperature so much lower than that of the more centrally located areas of the component part that the already mentioned supporting effect is achieved and that the border or edge will not take part in the deep draw process, as for instance in the manufacture of yogurt cups with thick edges and relatively high drawing depth and similar containers.

When proceeding according to the invention, it is of particular advantage that the component parts be heated by means of contact heating and preferably from both sides and under pressure. This allows not only support for them during heating by means of a contact heating press and thus prevent any undesired deformation due to pressure in between the presses, but also one may achieve very easily a limited heating of the middle of the component part while keeping the edge cool, so that the parts to be heated may be very easily separated from those to be kept cool. To prevent translation of the component parts because of heating and softening, a device according to the invention is characterized by making use of one of the two tensioning frame parts as a holder for the component parts during heating and fixing the position of the component parts by a high edge and/or suction jets and/or mechanical binding devices. So as to make use of gravity for holding in place the component parts on or in the tensioning frame part, the lower part of latter will appropriately be used for such purposes. If the outer edge of the component part is to remain cool, the holder will be kept at a temperature below the softening point of the synthetic materials. But if on the other hand the entire component part must be softened, then the holder too will be suitably heated.

Heating of the remaining portion of the component part is performed by means of a pair of heating presses coming together from both sides of the component part. In this fashion one may achieve contact heating under fairly large pressure. If the component part is wavy or has a surface not entirely plane, then the presses will also ultimately reach those dented parts because of the yielding of the higher areas which have softened under the initial heating. Contact heating in this manner allows very rapid heating of the entire foil surface and thickness. If heating takes place at several successive stations of a progressive processing path such as a rotating table, pairs of heating presses are always mounted at such stations so that they will successively process the foil. These heating presses will be suitably kept at the same temperature one with respect to another and below that which might cause damage to the synthetic being processed, so that upon accidental machine stoppage the presses will not be subjected to a foil which is too soft. This does not mean however that all successive pairs of presses must be at the same temperature: rather the first one might be at a higher temperature than the critical one previously mentioned so as to allow faster heating, whereas the last one may be at the temperature required for the foil at that location.

In lieu of pairs of presses at the individual stations, one may also have pairs of presses moving along with the component parts.

The tensioning frame parts serving as holders for the foils during heating are appropriately made up of counter-frames. In an advantageous embodiment of the invention, a number of such counter-frames are mounted on a conveying means such as a rotating table, whereas the forming or molding frame, that is, that part of the frame working in concert with the shaping form or being connected with same, will be provided only at the deep-draw station. In another embodiment a number of molding or forming frames mounted on another or second conveying means, particularly on a rotating table, works in harmony with the first conveying means of the counter-frames at the deep-draw station. When rotating tables are being used as the conveying means, they are so arranged that their conveying circles touch one another at the deep-draw station. Therefore the counter-frames of one conveying means line up with the forming or molding frames of the other conveying means. An arrangement of several forming or molding frames on one special rotating table carries the advantage that despite prior methods, cooling of the formed object need not take place at the deep-draw station, but may take place at a subsequent station. Therefore a lay-over period at the deep-draw station may be reduced to a minimum, allowing an increase in the number of stamping strokes (number of deep-draw operations per unit time).

A further advantage of an arrangement consisting in several forming or molding frames is that further operations may be sequentially performed when this conveying means is at those stations subsequent to that for deep-drawing, for instance the removal or special forming or molding of the container edge or border, connection with other parts, filling and sealing, etc. Also, one may heat up the form or mold at a station preceding that of the deep draw station, or one may insert into the forms or molds an outer container which is to receive the component part to be deep-drawn. There are for instance margarine cups made up of an outer container sleeve part of cardboard and of an inner deep-drawn lining. When dealing with the device according to the invention, the preformed cardboard part may be inserted into the form or mold prior to the deep-draw station. At the deep-draw station, the foil will be immediately drawn into the sleeve part. It is assumed that the outer container part is porous or permeable to air or that orifices are provided so that the air may escape from the interior. If the container lining is to be glued to the outer sleeve part, then the adhesive may be applied at a station prior to the deep-draw station to the inside of the outer sleeve part. Alternately one may also provide a high frequency sealing facility at a station following the deep-draw one for sealing the container lining to the outer sleeve part.

It is self-evident that the device according to the invention is not dependent upon the conveying means being rotating tables, even though their use is particularly advantageous. In a particularly advantageous variation of the rotating table embodiment, the holders for the component parts are not located immediately on the rotating table, but rather on arms which in turn are pivotably fastened to the rotating table, the rotating axles or axes of the arms lying parallel to the axis of rotation of the rotating table. On one hand the holders mounted on those arms may be aligned with pairs of heating presses at a location close to the rotating table's axis of rotation, these presses moving together relative to the rotating table, and on the other hand, they may pivot towards the deep-draw station. This provides operational space for the deep-draw tools that otherwise would be hampered by the heating presses. This principle of construction further holds the potential of continuously allowing the rotating table to rotate, — this table holding the arms — and to let the holder remain at rest temporarily at the deep-daw station. In that case the arms may move to some extent in a plane normal to the axis of the rotating table.

The diagrammatically shown examples of the invention will be discussed in greater detail below with reference to the drawings in which:

FIG. 1 is a sectional view of the conveying path of a component part from heating to ejection;

FIG. 2 is a diagrammatic top view of the rotating table arrangement of a machine according to the invention and, FIG. 3 is a top view corresponding to FIG. 2 of another embodiment.

Figure 4:
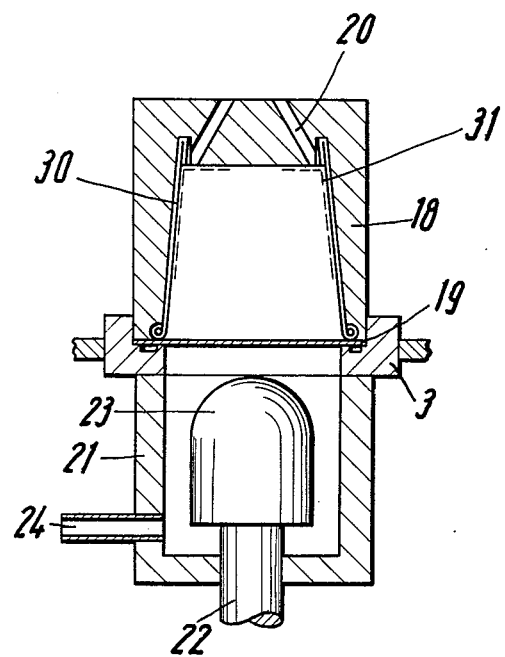
FIG. 4 is a sectional representation of FIG. 1, station III, showing a container in a sleeve within the deep-draw form or mold.

A plurality of holders 3, mounted on intermittently rotating table 1, and equally spaced with respect to angle and radial distance from the axis of rotation, consist of a support ring 4 with a high collar or lip 5. The ring 4 and the inside face 6 of collar 5 are shaped to correspond to the shape to be assumed by the component part 7 upon processing. When containers are to be manufactured, which have circular edges, the ring 4 and face 6 are also circular. The holder is provided with devices ensuring reliable support for the component part in the holder. In the horizontal position of the holder shown in FIG. 1, collar 5 often is enough to secure the component part. In addition one may use the already known devices for providing suction as shown at position I in FIG. 1 at 8, which will secure the edge of the component part, such devices for instance consist of a circular groove with channels for connection to suction. Other holding devices are illustrated at station II of FIG. 1, namely, peripherally equally spaced balls 9 which snap over the edge of component part 7 inserted in the holder.

A component part 7 is inserted in each holding device 3 located at station I of rotating table 1. This component part may be previously stamped out at an arbitrary location and then be fed to 3, but preferably it should be stamped out at this very station by means of a die 10 and matrice 11 from a foil strip 12. The die's downward motion leads to and into holder 3.

By stepwise rotation of rotating table 1, component part passes from station I to station II, the latter being fashioned into a heating station with two heating presses 14 and 15 compressing the foil from top and bottom, so that upon gradual softening of the foil, full contact and good heat transfer are achieved. Contact heatng by means of the sharply defined and compressed presses allows heating a sharply defined area of the component part. If full-area heating of the component part is desired, holder 3 will be accordingly heated and then upper press 14 is provided with a contact area fully covering the component part.

A total of three consecutive heating stations are provided for as shown in cross-section in FIG. 1 below II at rotating table 1. (See also stations II, II & II in FIG. 2.) When processing thin foils, two stations might be enough, sometimes even one.

Rotating table 1 touches another rotating table 17 with 4 stations at station III. There are four forming or molding parts 18 in four corresponding angular sectors. The two rotating tables are so arranged with respect to one another as to be provided with a coinciding station III at the deep-draw station. Their motion is so controlled in synchronism that a holder 3 and a molding or forming part 18 are always located at the deep-draw station III. This condition is illustrated in station III of FIG. 1. A forming or molding part 18 mounted on rotating table 17 above holder 3 is pressed along a circular area 19 against the edge of the component part which is supported at the bottom by support ring 4 of holder 3. Together with this area and with ring 4, it forms the tensioning frame. Compression between forming or molding part 18 and holder 3 is so large that the edge of the component part will be adequately sealed even when there is only little edging. Forming or molding part 18 is made axially movable for that purpose.

Recess 21 is shown under holder 3 and at station III; the push-rod 22 of press 23 is guided therein, achieving in known manner the deep-draw-process, the foil being subjected to a pressure directed from bottom to top for the deep-draw process and which may be facilitated either by connecting a vacuum source to channels 20 of the forming or molding part 18 and/or by a compressed air connection to channel 24 of recess 21. The control of the deep-draw process is similar to that known in the prior art. Upon termination of the deep-draw process, press 23 returns to its initial position and separation occurs between the forming or molding frame made up of the forming or molding part 18 and the holder 3 by means of relative axial motion, whereafter holder 3 arrives at station IV, while the forming or molding frame advances to station V of rotating table 17 as shown in FIG. 2. If the vacuum in the forming or molding part 18 is maintained, the entire formed or molded object will remain in the forming or molding part 18 during this feed-motion. This results in the advantage that without regard for cooling conditions, the deep-fraw operation at station III may be made arbitrarily short, while cooling is possible during the feed-motion to station V and if necessary even while still at that station. One might for instance cool by means of a cold spray at station V. This indicates further that it is not necessary to conduct away the heat contained in the formed or molded object solely by the lower temperature of the forming or molding part 18 and that it may even be possible to heat the latter with respect to deep-draw technical requirements prior to the deep-draw station at III. For such an arrangement ejection and storing or piling up of the objects formed or molded takes place at station VI, and the forming or molding part 18 might again be heated at station VII, for instance by means of a hot spray or otherwise. Other preparatory measures might also be undertaken, for instance the form or mold 18 and one of the deep-drawn objects might be sprayed with an anti-static substance. In another possible embodiment of the invention, one might insert at station VII a paper cup or the like or a container porous to air which would then be lined at station III with a deep-drawn foil.

If instead a vacuum is maintained in ring-groove 8 of holder 3, the formed or molded object remains in this holder following deep-drawing and may thereupon be ejected at station IV of the rotating table and be stored there.

It is self-evident that the number of stations at the two rotating tables may be reduced or increased if additional operations are introduced or if some of the explained operations are omitted.

Construction and operation of the machine shown in FIG. 3 corresponds to the machine discussed with regard to FIG. 2, however the holders are not connected directly to rotating table 1, but rather are mounted at 25 to the ends of arms 26, where the latter are supported at 27 to the periphery of rotating table 1, these arms 26 being spaced from one another at equal angular spacings corresponding to the lengths of stepwise drives for table 1. These arms may assume at least two positions: in the first position, as shown at 28, they are aligned with the heating devices at stations II and are positioned near the periphery of table 1, the heating devices rotating with table 1; in the second position, shown as pivoted outwardly at 26, they are aligned with the deep-draw station III associated with table 17. This arrangement brings the advantage of keeping continuous the effect of the heating arrangements during transfer from station to station.

The embodiment illustrated in FIG. 3 further shows that there is no need to restrict the number of objects being treated at one time at one station to unity, but that rather a multiple number of objects may be treated simultaneously and particularly may be simultaneously deep-drawn.

The example of the embodiment shown in FIG. 4, corresponds to that of FIG. 1. For simplicity's sake only station III is shown, where deep-drawing takes place. The figure shows a paper cup 30 inserted in the forming or molding part 18. Such cup might for instance be inserted at station VI (FIG. 2) into the forming or molding part or at a later station (for example station VII in FIG. 2), the inner surface of the cup may be provided with an adhesive 31 if desired. At station III, the foil will be deep-drawn into the cup by means of the deep-drawing process. At station V, the lined cup may be ejected.

The combination of the deep-draw process with cup glueing and lining may be carried out particularly advantageously when using the present process and device because it requires no special means for compressing the parts to be glued together. The compression required for glueing is automatically obtained from the pressure differential available during deep-drawing of the foil.

It is essential that the adhesive at the deep-draw station be of such consistency as to offer, immediately after deep-drawing, sufficient adhesion for the foil. Under some circumstances it may be appropriate to achieve such adhesion by predrying the adhesive to some degree prior to its reaching the deep-drawing station, for instance by means of a dry hot air blast.

The adhesive should not cover the entire inner surface of the paper cup in one continuous film, since otherwise the required air exhaustion from the cup for proper deep-drawing cannot take place. Only a partial deposition of adhesive is required, or else a perforation must be provided. Partial deposition of the adhesive in small and finely distributed droplets is particularly appropriate. Such distribution is achieved by spraying the glue into the paper cup by means of one or several fine jets or nozzles. Spraying the glue further carries with it the advantage that an appreciable fraction of the glue's solvents will evaporate during spraying and that thereby the required consistency for glueing at the deep-draw station will be obtained even for high work rates without special drying means.

What is claimed is:

1. Apparatus for manufacturing deep drawn objects from cut out portions of a thermoplastic foil material of uniform thickness, the objects having a central deep drawn part and a uniform marginal edge projecting radially from the top thereof, said apparatus comprising a series of holders, a conveyor for conveying said holders through at least one heating station and a deep drawing station, each holder having an annular supporting face for supporting one side of the margin of one of said portions and means for maintaining the margin on the supporting face during conveying movement and at the heating station, said means leaving free the side of the margin opposite to the supporting face, at least one pair of contact heating elements provided at the at least one heating station for pressing and heating the central part of the cut out portion between them, a mould provided at the deep drawing station and having a frame at its open end, said frame and said holder at the deep drawing station being movable relative to each other to press the supporting face of the holder against the frame for clamping the margin of the cut out portion therebetween, and means for deep-drawing the heated central part of the cut out portion while the margin of the cut out portion is clamped between said frame and said holder, whereby the clamped margin of the cut out portion remains undeformed by the deep drawing step.

2. Apparatus as claimed in claim 1, wherein said holders are maintained at a temperature below the softening point of the thermoplastic foil.

3. Apparatus as claimed in claim 1, wherein the holders are heated to the deep-drawing temperature.

4. Apparatus as claimed in claim 1, wherein the conveyor means includes a first rotating table having a plurality of holders mounted thereon.

5. Apparatus as claimed in claim 4, wherein said conveyor means further includes a second rotating table having a plurality of moulds mounted thereon, said second rotating table being tangential to said first rotating table only at the deep-drawing station thereof.

6. Apparatus as claimed in claim 5, and further comprising a cooling station provided on the second rotating table following the deep-drawing station.

7. Apparatus as claimed in claim 1, wherein the contact heating elements are provided at several successive stations the temperatures thereof decreasing in the conveying direction.

8. Apparatus as claimed in claim 1 and further comprising arms adjacent the periphery of the first rotating table and pivotable about an axis parallel to the axis of the first rotating table, said holders being mounted thereon, said arms being, in one position, aligned with the contact heat presses and, in the other position, aligned with the deep-drawing station.

* * * * *